United States Patent [19]
Imai et al.

[11] Patent Number: 5,333,474
[45] Date of Patent: Aug. 2, 1994

[54] WASHING MACHINE

[75] Inventors: Masahiro Imai, Seto; Yoshiyuki Makino, Nagoya, both of Japan

[73] Assignee: Kabushiki Kaisha Toshiba, Kawasaki, Japan

[21] Appl. No.: 120,243

[22] Filed: Sep. 13, 1993

[30] Foreign Application Priority Data

Sep. 14, 1992 [JP] Japan .................. 4-244741

[51] Int. Cl.$^5$ .................................. D06F 33/02
[52] U.S. Cl. .................. 68/12.16; 68/23.6; 68/133; 318/754
[58] Field of Search .............. 68/12.01, 12.16, 12.02, 68/23, 23.6, 23.7, 133; 318/754

[56] References Cited

U.S. PATENT DOCUMENTS

| | | | |
|---|---|---|---|
| 3,872,694 | 3/1975 | Sikamuri et al. | 68/12.16 |
| 3,967,172 | 6/1976 | Denny | 318/227 |
| 4,041,360 | 8/1977 | Morris | 318/221 R |
| 4,642,536 | 2/1987 | Boyd, Jr. et al. | 68/12.16 |
| 4,853,605 | 8/1989 | Matsuo et al. | 68/12.16 |
| 4,972,134 | 11/1990 | Getz et al. | 318/817 |
| 4,986,092 | 1/1991 | Sood et al. | 68/12.16 |

FOREIGN PATENT DOCUMENTS

| | | | |
|---|---|---|---|
| 0433491A1 | 12/1989 | European Pat. Off. | H02P 5/28 |
| 2333074 | 6/1977 | France | 68/12.16 |
| 1169059 | 10/1969 | United Kingdom | H02P 7/48 |
| 2087933 | 6/1982 | United Kingdom | 68/12.16 |
| 1199469 | 7/1990 | United Kingdom | H02P 5/28 |

OTHER PUBLICATIONS 433,491 European Applications, Jun. 1991.

*Primary Examiner*—Frankie L. Stinson
*Attorney, Agent, or Firm*—Limbach & Limbach

[57] ABSTRACT

A washing machine includes a rotational tub, a single-phase induction motor driving the rotational tub in a dehydrating operation and having a main and an auxiliary coils, a speed detector for detecting a speed of the motor, thereby generating a detection signal, and an output changeover device for changing between an operation mode in which both of the main and auxiliary coils are excited and the other operation mode in which either the main or auxiliary coil is excited. When the motor speed is increased in the dehydrating operation, a control circuit controls the motor in a feedback manner. More specifically, in low and medium speed ranges, the control circuit executes a control pattern in which both of the main and auxiliary coils are excited and selectively executes another control pattern in which only the auxiliary coil is excited when necessary.

12 Claims, 6 Drawing Sheets

WASHING MACHINE

BACKGROUND OF THE INVENTION

1. Field of the Invention

This invention relates to washing machines including a single-phase induction motor provided for driving a rotational tub in a dehydrating operation and having a main winding and an auxiliary winding, and more particularly to such washing machines wherein the rotational speed of the single-phase induction motor is controlled by exciting selectively either one or both of the main and auxiliary windings.

2. Description of the Prior Art

A single-phase induction motor has been generally used for wash and dehydrating operations in washing machines. It is well known in the art that a desired dehydrating operation can be performed by controlling an ascent curve of the rotational speed of the single-phase induction motor. The prior art has provided for an arrangement that a primary voltage of the single-phase induction motor is controlled by controlling the phase of an AC power supply output. However, a large harmonic voltage inevitably results from the phase control as described above. The generation of such a large harmonic voltage accompanies an electromagnetic noise, which causes a problem of radio interference.

To solve the above-described problem, the prior art has recently proposed an arrangement that the motor speed is controlled by selectively exciting either one or both of the main and auxiliary coils. The harmonic voltage can be reduced in the proposed arrangement as compared with the phase control.

In the proposed arrangement, a developed torque is increased in a control pattern wherein both of the main and auxiliary coils are excited, when the motor speed is in the low or medium speed range or when the slip is relatively large. However, the electromagnetic noise is not abnormally increased since the nonuniformity in the torque is relatively small. On the other hand, where a control pattern wherein only the main coil is excited is selected when the motor speed is in the low or medium speed range, a relatively large torque nonuniformity is caused under the condition that the developed torque is larger than that in the control pattern wherein only the auxiliary coil is excited, resulting in a relatively large electromagnetic noise.

Furthermore, the maximum speed differs between at the power supply frequencies of 50 and 60 Hz when the single-phase induction motor is controlled in the manner as described above with the same load applied thereto. Consequently, the dehydrating performance of the washing machine differs between a region where the power supply frequency of 50 Hz is employed and a region where the power supply frequency of 60 Hz is employed.

To solve the above-described problem, the prior art has proposed the following countermeasure: the power supply frequency is detected and the motor is operated at the normal speed depending upon the detected frequency when it is at 50 Hz. When the detected frequency is at 60 Hz, the final target speed of the motor is controlled to correspond to the normal speed at 50 Hz. However, this countermeasure necessitates the power supply frequency detecting means and control programs need to be changed in the power supply frequencies of 50 and 60 Hz. Consequently, the circuit arrangement is complicated.

SUMMARY OF THE INVENTION

Therefore, a primary object of the present invention is to provide a washing machine wherein generation of the harmonic voltage can be restrained in the case where the speed of the single-phase induction motor driving the rotational tub is increased in the dehydrating operation, which results in reduction of the electromagnetic noise.

Another object of the invention is to provide a washing machine wherein substantially the same dehydrating performance can be obtained at power supply frequencies of 50 and 60 Hz by a simplified arrangement.

To achieve the primary object, the present invention provides a rotational tub, a single-phase induction motor driving the rotational tub in a dehydrating operation and having a main and an auxiliary coils, speed detecting means for detecting a speed of the motor, thereby generating a detection signal, output changeover means for changing between an operation mode wherein both of the main and auxiliary coils are excited and the other operation mode wherein either the main or auxiliary coil is excited, and speed control means for feedback controlling the motor by controlling the output changeover means in a stage of increase of the motor speed in the dehydrating operation, based on the detection signal from the speed detecting means and a control program stored therein. The control program stored in the speed control means includes data of a first control pattern wherein both of the main and auxiliary coils of the motor are excited in low and medium speed ranges, a second control pattern wherein only the auxiliary coil of the motor is excited in the low and medium speed ranges, a third control pattern wherein both of the main and auxiliary coils of the motor are excited in a high speed range, and a fourth control pattern wherein either the main or auxiliary coil is excited in the motor high speed range. The speed control means executes the first control pattern in the low and medium speed ranges and further selectively executes the second control pattern in the low and medium speed ranges when necessary and executes either the third or fourth control pattern in the high speed range.

In the low and medium speed ranges of the motor, the control pattern wherein only the auxiliary coil is excited is selectively executed when necessary, in addition to the control pattern wherein both of the main and auxiliary coils are excited, so that the motor speed is controlled. In the high speed range of the motor, the speed control means selectively executes either the control pattern wherein both coils are excited or the control pattern wherein either one of the coils is excited.

As the result of the above-described control, generation of such a large harmonic voltage as generated in the phase control of the motor speed can be restrained. A large torque can be obtained in the control pattern wherein both coils are excited. However, an abnormal increase in the noise can be prevented since the nonuniformity in the torque is relatively small. Furthermore, in the control pattern wherein only the auxiliary coil is excited, the developed torque is small as compared with that in the case where only the main coil is excited. However, the generated electromagnetic noise is reduced accordingly, which restrains generation of the loud electromagnetic noise in the low and medium speed ranges of the motor.

In a preferred form, the speed control means increases stepwise control target values of the motor speed in the low and medium speed ranges every time a predetermined period of time elapses. The motor speed can be built up smoothly in the dehydrating operation, which can improve the dehydrating performance.

In another preferred form, only a final target value is set in the speed control means as the control target value of the motor speed in the motor high speed range. The multistage setting of the target speeds is not required in the high speed range of the motor in this arrangement. Consequently, the control program of the speed control means can be simplified.

In further another preferred form, the output changeover means includes a plurality of semiconductor switching elements each having control electrodes. The semiconductor switching elements are interposed between each coil of the single-phase induction motor and a power supply. The speed control means controls the control electrodes of the semiconductor switching elements. In this arrangement, a plurality of photo couplers may be provided for electrically insulating between the speed control means and the control electrodes of the semiconductor switching elements of the output changeover means. Consequently, the malfunction of the semiconductor switching elements can be prevented.

The washing machine may further comprise a power transmission mechanism transmitting a driving force of the motor to the rotational tub and wash stream producing means supplied with the driving force of the motor via the power transmission mechanism in a wash operation. A single motor can be used both for the dehydrating operation and the wash operation.

In the case where the power transmission mechanism is provided in the washing machine, the single-phase induction motor may comprise two coils switched to serve as the main and auxiliary coils so that the motor develops torque in clockwise and counterclockwise directions in accordance with the switching of the coils. The output changeover means may switch the relation between the main and auxiliary coils such that one of the motor coil is directly connected to the power supply to serve as the main coil and such that the other coil is connected through a phase advance capacitor to the power supply to serve as the auxiliary coil. The speed control means may cyclically switch the relation between the main and auxiliary coils by controlling the output changeover means in the wash operation so that the motor is cyclically rotated alternately forward and reverse. In the above-described arrangement, the output changeover means may include a plurality of semiconductor switching elements each having control electrodes, the semiconductor switching elements being interposed between each coil of the single-phase induction motor and a power supply and between each coil of the single-phase induction motor and the phase advance capacitor. The speed control means may control the output changeover means via the control electrodes of the semiconductor switching elements. In this case, too, the malfunction of the semiconductor switching elements can be prevented when a plurality of photo couplers are provided for electrically insulating between the speed control means and the control electrodes of the semiconductor switching elements of the output changeover means.

In the arrangement that the phase advance capacitor and the semiconductor switching elements are provided as described above, an inductance element is preferably connected in series to the phase advance capacitor for buffering a discharge current of the phase advance capacitor. Consequently, the semiconductor switching elements can be prevented from being broken by the noise.

To achieve the second object, the invention provides a washing machine in which the single-phase induction motor driving the rotational tub in a dehydrating operation is set at a final target speed higher than a normal speed at a power supply frequency of 50 Hz and lower than a normal speed at a power supply frequency of 60 Hz in the dehydrating operation. Speed control means is provided for feedback controlling the speed of the motor by controlling the output changeover means in the dehydrating operation, based on the detection signal from the speed detecting means and predetermined target speeds of the motor.

In contrast, power supply frequency detecting means can be eliminated when the final target speed of the motor in the dehydrating operation is set at a predetermined speed lower than the normal speed at the power supply frequency of 50 Hz and the motor is feedback controlled on the basis of the final target speed and the actual speed. In this case, the control program can be used in common to the power supply frequencies of 50 and 60 Hz and accordingly, the same dehydrating performance can be achieved regardless with the power supply frequency. However, the above-described setting of the final target speed of the motor results in surplus power for the motor maximum speed or the dehydrating performance. Thus, a problem arises that the originally provided dehydrating performance cannot be sufficiently drawn.

In the above-described arrangement of the invention, however, the final target speed of the motor in the dehydrating operation is set at the speed higher than the normal speed at a power supply frequency of 50 Hz and lower than the normal speed at a power supply frequency of 60 Hz in the dehydrating operation. Consequently, a full dehydrating performance can be achieved without changes in the control program at the power supply frequency of 50 Hz since the motor necessarily rises to its normal speed. Furthermore, the motor speed is controlled to be lower than the normal speed at the power supply frequency of 60 Hz. Thus, substantially the same dehydrating performance can be achieved both at 50 and 60 Hz.

In the above-described arrangement, the speed control means may have a control pattern in which both of the main and auxiliary coils are excited and continuously executes the control pattern in a high speed range of the motor in the dehydrating operation until the speed of the motor reaches the final target speed. Consequently, the motor speed can rapidly rise to the final target speed.

Other objects of the present invention will become obvious upon understanding of the illustrative embodiment about to be described. Various advantages not referred to herein will occur to those skilled in the art upon employment of the invention in practice.

BRIEF DESCRIPTION OF THE DRAWINGS

Several embodiments of the invention will be described with reference to the accompanying drawings, in which.

DESCRIPTION OF THE PREFERRED EMBODIMENTS

Figure 1:
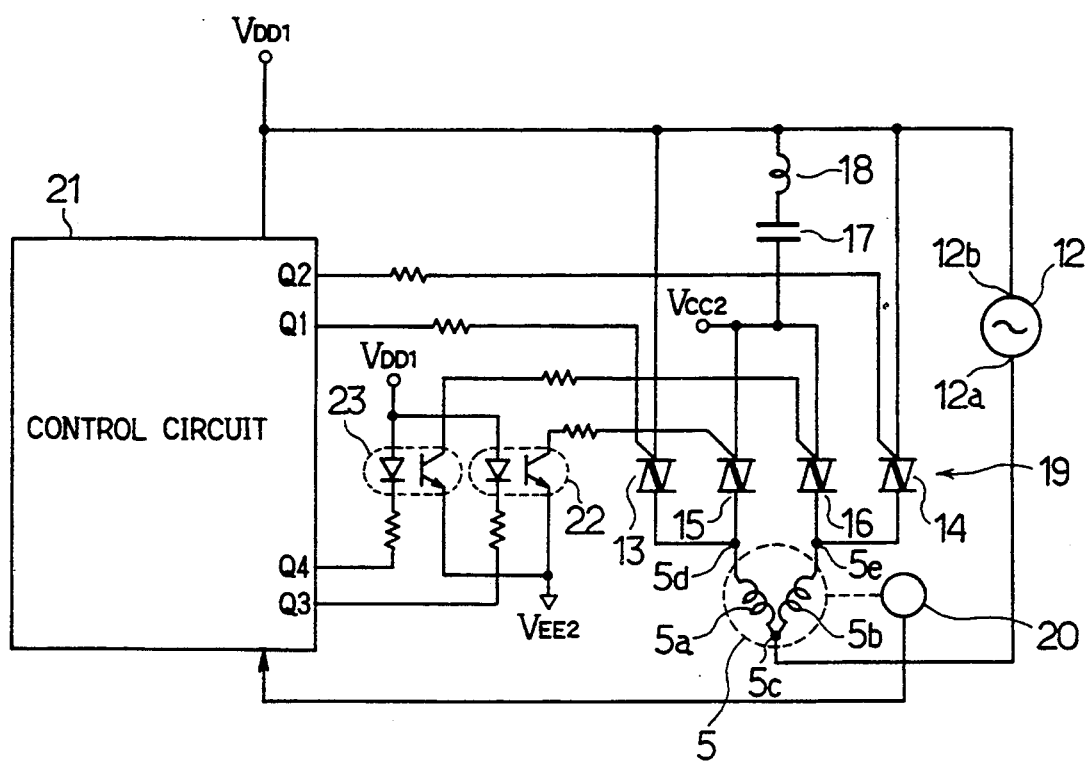
FIG. 1 is a circuit diagram showing an electrical arrangement of the washing machine in accordance with a first embodiment of the invention.

A first embodiment of the invention will be described with reference to FIGS. 1 to 4. Referring to FIG. 2, there is shown an automatic washing machine in accordance with the invention. An outer cabinet I encloses a water-receiving tub 2 elastically suspended therein. A rotational tub 3 serving both for wash and for dehydration is rotatably mounted in the water-receiving tub 2. An agitator 4 serving as water stream producing means in a wash operation is rotatably mounted on the inner bottom of the rotational tub 3. A single-phase induction motor 5 which will be referred to as "motor" hereafter and a power transmission mechanism 6 for transmitting a driving force of the motor 5 to the rotational tub 3 and the agitator 4 are provided beneath the water-receiving tub 2. A drain pipe 2a is coupled to the bottom of the water-receiving tub 2. The drain pipe 2a is provided with an electromagnetic drain valve 7 which is energized to be opened.

The power transmission mechanism 6 includes a belt drive mechanism, a reduction mechanism, a clutch and a brake (none of them shown), as well known in the art. In a wash operation wherein the drain valve 7 is deenergized to be closed, the rotational tub 3 is braked by the power transmission mechanism 6 to be held in the braked condition and the driving force of the motor 5 is decelerated and then transmitted to the agitator 4. Furthermore, in a dehydrating operation wherein the drain valve 7 is energized to be opened, the rotational tub 3 is released from its braked state simultaneously with deenergization of the drain valve 7 and the driving force of the motor 5 is transmitted to the rotational tub 3.

An electromagnetic water-supply valve 9 is provided in the rear space defined by a top cover 8 of the outer cabinet 1. The water-supply valve 9 is energized to be opened, thereby supplying water into the rotational tub 3. A water level sensor 10 is also provided in the rear space for detecting the water level in the rotational tub 3 by way of an air trap (not shown). A control unit 11 is provided in the front space defined by the top cover 8 for controlling the wash and dehydrating operations.

Figure 2:
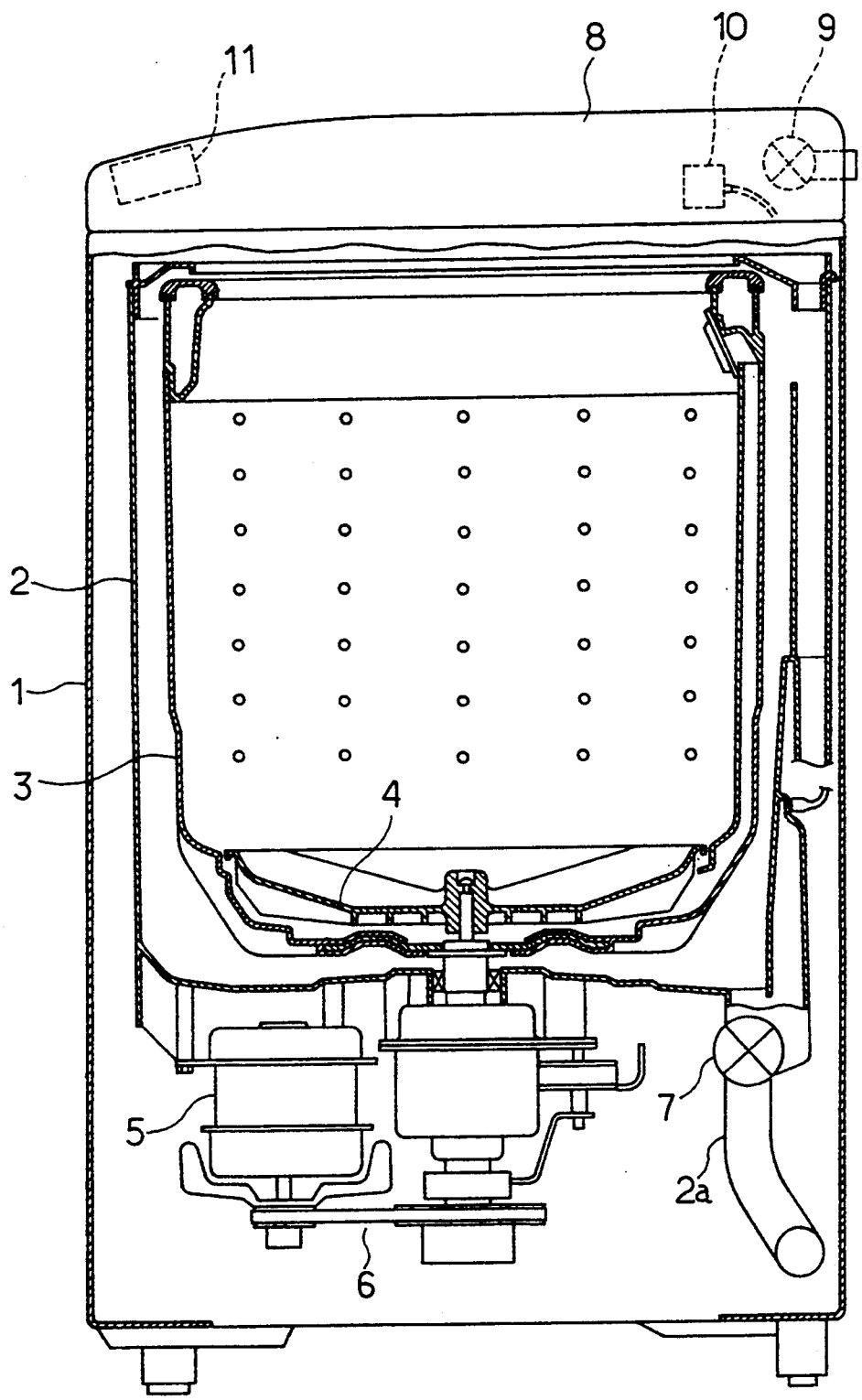
FIG. 2 is a longitudinally sectional side view of the washing machine.

Referring now to FIG. 1, the motor 5 comprises two coils 5a and 5b spaced 90 electrical degrees apart on the stator surface, as well known in the art of single-phase induction motors. In the embodiment, particularly, an effective turn ratio of the coil 5a to the coil 5b is set at 1:1. A common terminal 5c to which one ends of the coils 5a, 5b are connected is further connected to one terminal 12a of an AC power supply 12. A terminal 5d to which the other end of the coil 5a is connected is further connected to the other terminal 12b of the AC power supply 12 via a triac 13 serving as a semiconductor switching element having a control gate. In the same manner, a terminal 5e to which the other end of the coil 5b is connected is further connected to the terminal 12b via a triac 14 serving as the semiconductor switching element having the control gate.

One ends of triacs 15 and 16 each serving as the semiconductor switching element having the control gate are connected to the terminals 5d, 5e respectively. The other ends of the triacs 15, 16 are connected in series to a phase advance capacitor 17 and a coil 18 serving as an inductance element buffering a discharge current of the capacitor 17 and further connected to the terminal 12b of the AC power supply 12.

Output changeover means 19 is comprised of the abovementioned triacs 13-16, which are changed over selectively to any one of the following operation modes:

a) First Operation Mode

The triacs 13 and 16 are turned on and the triacs 14 and 15 are turned off in this mode. The coil 5a of the motor 5 is directly connected to both terminals 12a, 12b of the AC power supply 12, thereby serving as a main coil. The coil 5b is connected via the phase advance capacitor 17 and the coil 18 to both ends of the AC power supply 12, thereby serving as an auxiliary coil. In this mode, the motor 5 develops a torque turning a rotor in a counterclockwise direction.

b) Second Operation Mode

The triac 13 is turned on and the triacs 14, 15 and 16 are turned off in this mode. Only the coil 5a of the motor 5 is directly connected to the terminals 12a, 12b of the AC power supply 12, thereby serving as a main coil. The coil 5b is disconnected from the power supply 12. When the output changeover means 19 is changed over to this mode, the motor 5 develops the torque turning the rotor in the same direction as that at the time of the changeover. The developed torque is smaller than in the first operation mode.

c) Third Operation Mode

The triac 16 is turned on and the triacs 13, 14 and 15 are turned off in this mode. Only the coil 5b of the motor 5 is connected via the phase advance capacitor 17 and the coil 18 to the terminals 12a, 12b of the AC power supply 12, thereby serving as the auxiliary coil. The coil 5a is disconnected from the power supply 12. When the output changeover means 19 is changed over to this mode, the motor 5 develops the torque turning the rotor in the same direction as that at the time of changeover. The developed torque is smaller than that in the second operation mode.

d) Fourth Operation Mode

The triacs 14, 15 are turned on and the triacs 13, 16 are turned off in this mode. The coil 5b of the motor 5 is directly connected to the terminals 12a, 12b of the AC power supply 12, thereby serving as the main coil. The coil 5a of the motor 5 is connected via the phase advance capacitor 17 and the coil 18 to the terminals 12a, 12b of the power supply 12, thereby serving as the auxiliary coil. The motor 5 develops the torque turning the rotor in the clockwise direction. The developed torque is as large as that in the first operation mode since the effective turn ratio of the coil 5a to the coil 5b is set at 1:1.

e) Fifth Operation Mode

Only the coil 5b of the motor 5 is directly connected to the terminals 12a, 12b of the AC power supply 12, thereby serving as the main coil. The other coil 5a is disconnected from the power supply 12. When the output changeover means 19 is changed over to this mode, the motor 5 develops the torque turning the rotor in the same direction as that at the time of the changeover. The developed torque is as large as that in the second operation mode.

f) Sixth Operation Mode

The triac 15 is turned on and the triacs 13, 14 and 16 are turned off in this mode. Consequently, only the coil 5a of the motor 5 is directly connected via the phase advance capacitor 17 and the coil 18 to the terminals 12a, thereby serving as the auxiliary coil. The coil 5b is disconnected from the power supply 12. When the output changeover means 19 is changed over to this mode, the motor 5 develops the torque turning the rotor in the same direction as that at the time of the changeover. The developed torque is as large as that in the third operation mode.

The motor 5 is provided with speed detecting means 20 comprising a Hall element for detecting the rotational speed thereof. A detection signal generated by the speed detecting means 20 is supplied to a control circuit 21 serving as speed control means. The control circuit 21 is incorporated in the control unit 11 and comprises a microcomputer, gate circuits and an analog-to-digital (A/D) converter, none of which are shown. The control circuit 21 has data of the above-described operation modes and a control program. Based on the data and the control program, the control circuit 21 controls the output changeover means 19 so that the same is changed over to one of the above-described operation modes. In this case, the control circuit 21 outputs at output terminals Q1 and Q2 gate signals to the control gates of the triacs 13, 14 respectively and halts the output of the control signals, thereby turning on and off the triacs 13, 14. Photo couplers 22 and 23 are interposed, for electrical insulation, between output terminals Q3 and Q4 of the control circuit 21 and the control gates of the triacs 15, 16 of the output changeover means 19 respectively. The control circuit 21 outputs at the output terminals Q3, Q4 gate signals to the control gates of the triacs 15, 16 and halts the output of the gate signals such that the triacs 15, 16 are turned on and off via the photo couplers 22, 23 respectively.

In FIG. 1, a terminal $V_{DD1}$ serves as a DC power supply terminal at which a power supply current is supplied to the control circuit 21 and a primary current is supplied to the photo couplers 22, 23. Terminals $V_{CC2}$ and $V_{EE2}$ serve DC power supply terminals at which gate currents are supplied to the triacs 15, 16 via secondary sides of the photo couplers 22, 23 respectively.

The control circuit 21 controls the motor 5 in wash and dehydration steps as well as the above-described control. In the wash operation, the control circuit 21 cyclically changes over the main coil of the motor 5 between the coils 5a, 5b via the output changeover means 19, thereby driving the motor 5 in the forward and reverse directions. More specifically, for example, the control circuit 21 controls the output changeover means 19 so that it is changed over to the first and fourth operation modes alternately at predetermined intervals. Consequently, the motor 5 and accordingly, the agitator 4 are driven in the forward and reverse directions at the predetermined intervals.

Figure 3:
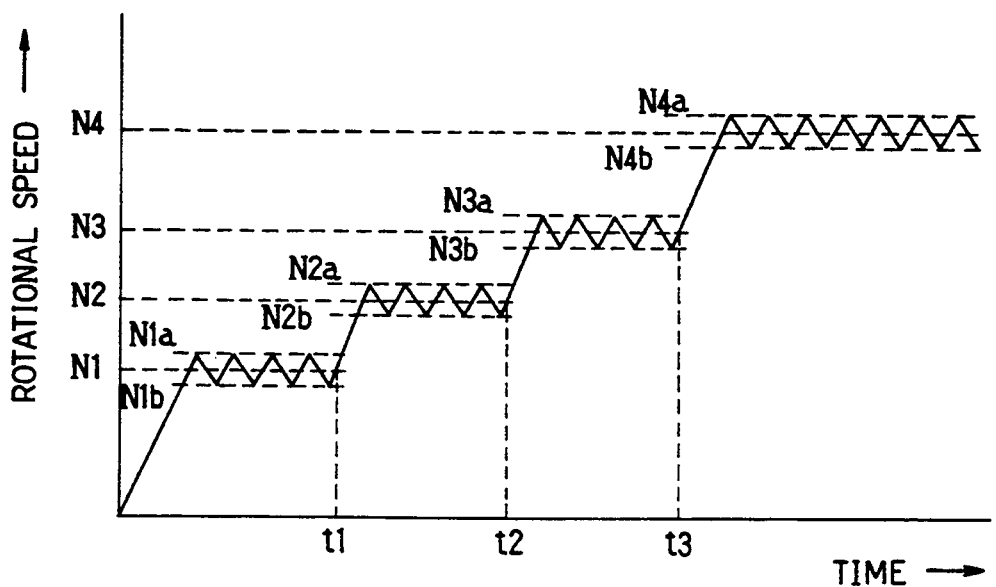
FIG. 3 is a graph showing characteristic curves of the increase in the motor speed.

In the dehydrating operation, the control circuit 21 controls the motor 5 in a feedback manner on the basis of the detection signal generated by the speed detecting means 20. The feedback control manner will be described. FIG. 3 shows target speeds N1, N2, N3 and N4 corresponding to target values of the rotational speeds of the motor 5 reached by the control, where N1 N2 N3 N4. The target speeds are set in the control circuit 21. N1a and N1b designate upper and lower limit speeds with respect to the target speed N1 and N2a and N2b designate upper and lower limit speeds with respect to the target speed N2, respectively. In the same manner, the target speed N3 has upper and lower limit speeds N3a and N3b and the target speed N4 has upper and lower limit speeds N4a and N4b. In the embodiment, the target speeds N1, N2 and N3 are ranged in lower and medium speed ranges and the target speed N4 corresponding to the final target speed is ranged in a high speed range.

1. Speed Control in a Time Period $t_1$ Starting at Initiation of Dehydrating Operation Upon start of the dehydrating operation, the output changeover means 19 is changed over to the above-described fourth operation mode in which the triacs 14, 15 are turned on and the triacs 13, 16 are turned off. Consequently, the coil 5b serves as the main coil and the coil 5a as the auxiliary coil. The motor 5 is operated in the control pattern that both of the main and auxiliary coils are excited. The motor 5 develops a relatively large torque producing clockwise turns and the torque is transmitted to the rotational tub 3 to thereby rotate it.

The output changeover means 19 is changed over to the sixth operation mode in which the triac 15 is turned on and the triacs 14, 15 and 16 are turned off, so that only the coil 5a serving as the auxiliary coil is excited. Consequently, the torque developed by the motor 5 is reduced. The rotational speed of the rotational tub 3 is decreased since a load torque of the tub 3 is usually larger than the developed torque at the initial stage of its rotation.

Subsequently, when the speed of the motor 5 is decreased to the lower limit speed N1b, the output changeover means 19 is returned to the fourth operation mode such that the rotational speed of the tub 3 is increased. The above-described control is thereafter repeated every time the rotational speed of the motor 5 increases to the upper limit speed N1a and decreases to the lower limit speed N1b. All the triacs 13–16 of the output changeover means 19 are turned off such that the motor 5 is deenergized, when the speed of the motor 5 reaches the upper limit speed N1a in spite of excitation of only the coil 5a serving as the auxiliary coil or when the load torque becomes smaller than the torque developed by the motor 5.

The motor 5 is controlled in the feedback manner so that its speed reaches the target speed N1 as described above. There is no case in the above control where only the coil 5b serving as the main coil is excited. The control circuit 21 completes the above-described control upon expiration of the time period $t_1$ and advances to the subsequent control.

2. Speed Control in a Time Period $t_2$ After Expiration of the Time Period $t_1$:

The output changeover means 19 is changed over to the fourth operation mode so that the speed of the motor 5 is built up in the control pattern that the coils 5a and 5b serve as the auxiliary and main coils respectively. When the motor speed reaches the upper limit speed N2a of the target speed N2, the output changeover means 19 is changed over to the sixth operation mode in which only the coil 5a serving as the auxiliary coil is excited.

Subsequently, when the speed of the motor 5 is reduced to the lower limit speed N2b, the output changeover means 19 is returned to the fourth operation mode in which the coils 5a serves as the auxiliary coil and the coil 5b serves as the main coil. Consequently, the rotational speed of the tub 3 is increased. The above-described control is thereafter repeated every time the rotational speed of the motor 5 increases to the upper limit speed N2a and decreases to the lower limit speed N2b. All the triacs 13-16 of the output changeover means 19 are turned off such that the motor 5 is deenergized, when the speed of the motor 5 reaches the upper limit speed N2a in spite of excitation of only the coil 5a serving as the auxiliary coil.

In this case, too, there is no case in the above control where only the coil 5b serving as the main coil is excited. The control circuit 21 completes the above-described control upon expiration of the time period $t_2$ and advances to the subsequent control.

3. Speed Control in a Time Period $t_3$ After Expiration of Time Period $t_2$:

The speed of the motor 5 is built up in the control pattern that the coil 5a and 5b serve as the auxiliary and main coils respectively, in the same manner as described above. When the motor speed reaches the upper limit speed N3a of the target speed N3, the output changeover means 19 is changed over to the operation mode in which only the coil 5a serving as the auxiliary coil is excited.

Subsequently, when the motor speed is decreased to the lower limit speed N3b, the output changeover means 19 is changed over to the operation mode in which the coil 5b serves as the main coil and the coil 5a serves as the auxiliary coil, so that the rotational speed of the tub 3 is increased. The above-described control is thereafter repeated every time the rotational speed of the motor 5 increases to the upper limit speed N3a and decreases to the lower limit speed N3b. All the triacs 13-16 of the output changeover means 19 are turned off such that the motor 5 is deenergized, when the speed of the motor 5 reaches the upper limit speed N3a in spite of excitation of only the coil 5a serving as the auxiliary coil.

In this mode, too, there is no case in the above control where only the coil 5b serving as the main coil is excited. The control circuit 21 completes the above-described control upon expiration of the time period $t_3$ and advances to the subsequent control.

4. Speed Control After Expiration of the Time Period $t_3$:

The output changeover means 19 is changed over to the fourth operation mode so that the speed of the motor 5 is built up in the control pattern that the coil 5a and 5b serve as the auxiliary and main coils respectively. When the motor speed reaches the upper limit speed N4a of the target speed N4, the output changeover means 19 is changed over to the fifth operation mode in which only the triac 14 is turned on and the other triacs 13, 15 and 16 are turned off, so that only the coil 5b serving as the main coil is excited.

Subsequently, when the motor speed is decreased to the lower limit speed N4b, the output changeover means 19 is returned to the fourth operation mode so that the coil 5b serving as the main coil and the coil 5a serving as the auxiliary coil are excited. Consequently, the rotational speed of the tub 3 is increased. The output changeover means 19 is changed over to the sixth operation mode so that only the coil 5a serving as the auxiliary coil is excited, when the motor speed reaches the upper limit speed N4a in the condition that the coil 5b serving as the main coil is excited or that the output changeover means 19 is in the fifth operation mode.

The motor 5 is controlled by the feedback manner as described above so that its speed reaches the target speed N4. Subsequently, the motor 5 is deenergized upon expiration of the set dehydrating time period so that the dehydrating operation is completed.

According to the above-described embodiment, either one or both of the main and auxiliary coils of the motor 5 are excited for the control of the motor speed when the motor speed is increased in the dehydrating operation. Consequently, generation of the harmonic voltage is restrained. More specifically, the slip is large in the low and medium speed ranges of the motor and the electromagnetic noise is relatively loud when only the main coil is excited in these speed ranges resulting in the large slip. However, the motor speed is controlled in these ranges by application of the output modes excluding the mode in which only the main coil is excited. Consequently, the generation of the electromagnetic noise can be restrained.

Furthermore, in the high speed range, the motor speed is controlled by application of either the operation mode in which both main and auxiliary coils are excited or the operation mode in which either coil is excited. Consequently, the efficiency of the dehydration can be improved. Even when only the main coil is excited in the high speed range in which the motor slip is small, the electromagnetic noise is rendered small as compared with the case where the motor slip is large. Thus, the problem of the electromagnetic noise is not caused in this case.

The target speed of the motor 5 is increased from the target speed N1 to the target speed N3 stepwise in the low and medium speed ranges in the dehydrating operation every time each predetermined time period expires. Consequently, the motor speed can be built up smoothly, which results in improvement of the dehydrating performance.

Furthermore, only the final target speed N4 is set as the target value of the motor speed in the high speed range. Thus, the setting of a plurality of target speeds is eliminated in the high speed range, which can simplify the control program of the control circuit 21.

The output changeover means 19 comprises the semiconductor switching elements or the triacs 13-16. The reliability of the switching operation can be improved as compared with the case where switching elements each having mechanical contacts are employed for the same purpose. Moreover, the photo couplers 22, 23 are interposed between the control circuit 21 and the control gates of the triacs 14, 15 for the electrical insulation therebetween respectively. Consequently, the malfunction of these triacs due to noise can be prevented.

Furthermore, the phase advance capacitor 17 is connected selectively to the auxiliary coil of the motor 4 and the coil 18 is connected in series to the phase advance capacitor 17 for buffering the discharge current thereof. Consequently, the triacs 13-16 can be prevented from being broken by the discharge current of the phase advance capacitor 17.

Figure 4:
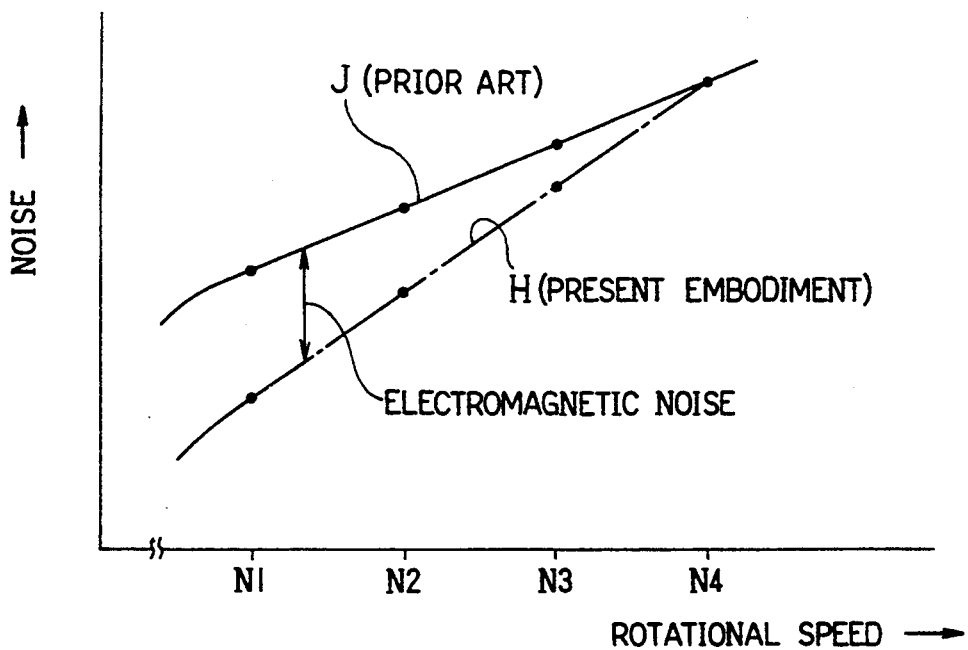
FIG. 4 is a graph showing characteristic curves of the noise induced in accordance with the motor motor.

Curve H in FIG. 4 shows the relation between the speed of the motor 5 and the produced electromagnetic noise and curve J shows the same relation in the prior art. The excitation of only the main coil is not done in the low and medium speed ranges in the foregoing embodiment while the excitation of both of the main and auxiliary coils and the excitation of only the main coil are selectively done in the low and medium speed ranges in the prior art. Curve J in FIG. 4 shows that the electromagnetic noise is a large factor of the motor noise in the low and medium speed ranges, while curve H shows that the production of the electromagnetic noise is restrained in the same speed ranges.

Figure 5:
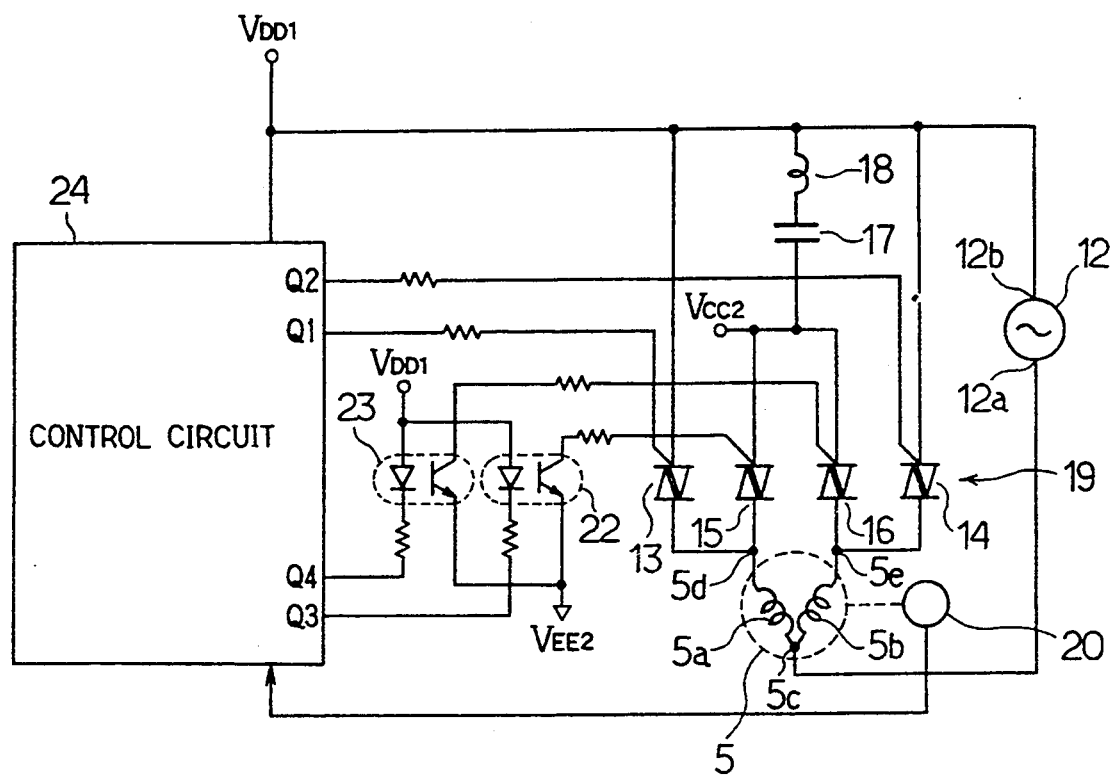
FIG. 5 is a view similar to FIG. 1 showing a second embodiment.
Figure 6:
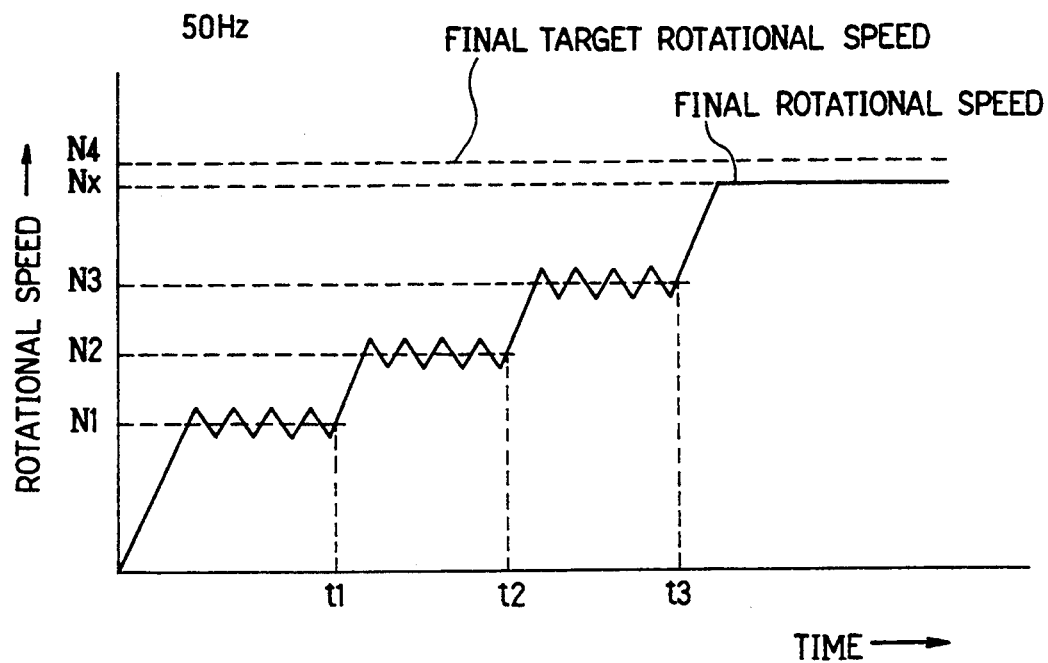
FIG. 6 is a graph showing characteristic curves of the increase in the motor speed at 50 Hz.
Figure 7:
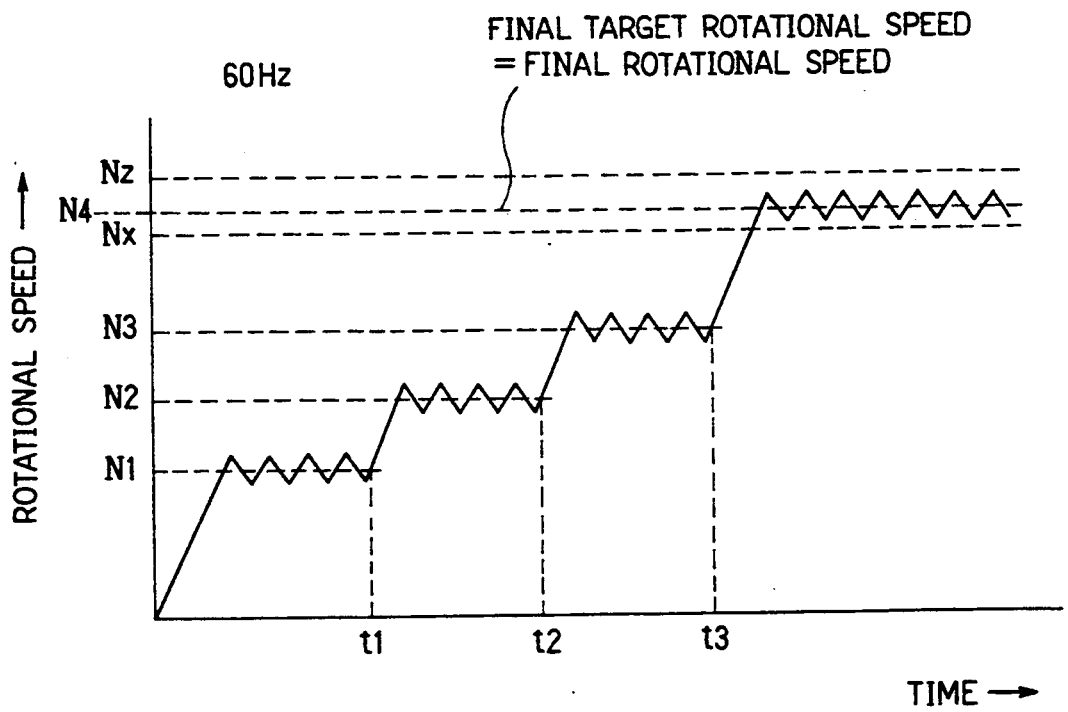
FIG. 7 is a view showing characteristic curves of the increase in the motor speed at 60 Hz.

FIGS. 5 to 7 illustrate a second embodiment of the invention. A control circuit 24 serving as the speed control means has the same hardware composition as of the control circuit 21 in the foregoing embodiment. The target speeds N1-N4 in the dehydrating operation are set in the control circuit 24 in the same manner as in the control circuit 21. In the control circuit 24, particularly, the final target speed N4 is set so as to be higher than a normal speed Nx of the motor 5 at a power supply frequency of 50 Hz of the power supply 12 and lower than a normal speed Nz of the motor 5 at the power supply frequency of 60 Hz of the power supply 12.

Based on the results of comparison between the signals from the speed detecting means 20 and the target speeds N1-N4, the control circuit 24 controls the motor 5 in the feedback manner by changing over the output changeover means 19 to one of the first to sixth output modes described above.

In the case of the power supply frequency of 50 Hz, the motor 5 is switched between the control pattern that both of the main and auxiliary coils are excited and the control pattern that either coil is excited, so that the motor speed reaches the target speeds N1-N3 sequentially. With respect to the target speed N4, the control pattern that both of the coils are excited is continued until the motor speed reaches the target speed N4.

Since the final target speed N4 is set to be higher than the normal speed Nx at the power supply frequency of 50 Hz in the above-described speed control, the final speed of the motor 5 corresponds to the normal speed Nx depending upon the power supply frequency of 50 Hz, as shown in FIG. 6. In the case of the power supply frequency of 60 Hz, furthermore, the speed control with respect to the final target speed N4 is performed in the same manner as in the case of 50 Hz. However, since the final target speed N4 is set to be lower than the normal speed Nz depending upon 60 Hz, the final speed of the motor 5 corresponds to the final target speed N4, as shown in FIG. 7. In the above-described control, the same speed control program is used in the control circuit for both frequency values.

According to the second embodiment, the final target speed N4 of the motor 5 in the dehydrating operation is set to be higher than the normal speed Nx at 50 Hz and lower than the normal speed Nz at 60 Hz. Consequently, a sufficient dehydrating performance can be achieved since the motor 5 is built up to the normal speed Nx without changes in the speed control program in the control circuit 24 in the case of the power supply frequency of 50 Hz. Furthermore, substantially the same dehydrating performance can be achieved at 60 Hz as that at 50 Hz since the motor speed is restrained to the final target speed N4 lower than the normal speed Nz at 60 Hz. Additionally, in the high speed range, the control pattern that both coils are excited is continuously executed until the motor speed reaches the final target speed N4. Thus, the motor speed can be rapidly increased to the final target speed N4.

Figure 8:
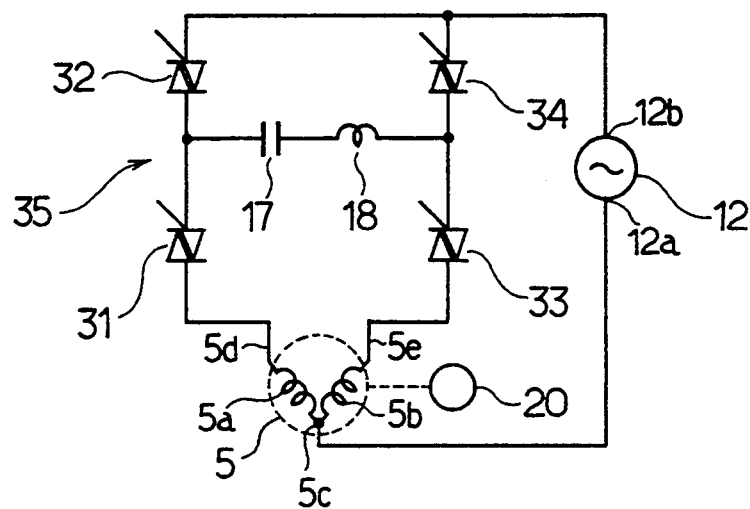
FIG. 8 is a circuit diagram of the output changeover means employed in a third embodiment.
Figure 9:
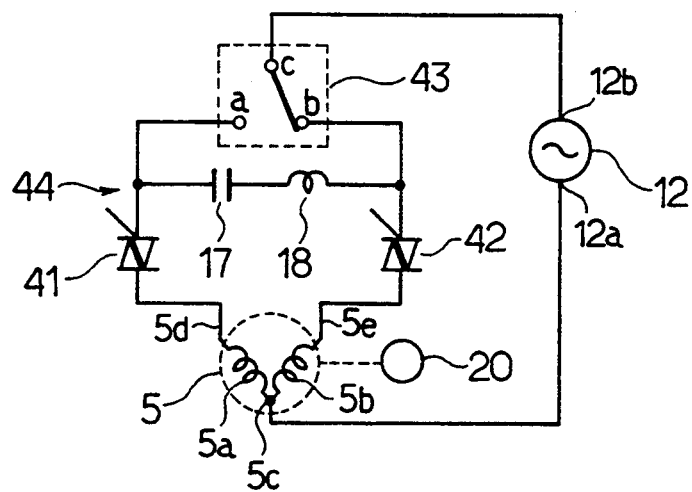
FIG. 9 is also a circuit diagram of the output changeover means employed in a fourth embodiment.

FIGS. 8 and 9 illustrate third and fourth embodiments of the invention respectively. These embodiments relate to the arrangement of the output changeover means. In the third embodiment as shown in FIG. 8, the output changeover means 35 comprises the triacs 31 and 32 serially connected between the motor terminal 5d and the power supply terminal 12b. The means 35 further comprises triacs 33 and 34 serially connected between the motor terminal 5e and the power supply terminal 12b. A series circuit of the phase advance capacitor 17 and the coil 18 is connected between a connection common to the triacs 31, 32 and a connection common to the triacs 33, 34.

According to the above-described arrangement of the third embodiment, the triacs 31, 32 and 33 are turned on so that the coil 5a of the motor 5 serves as the main coil and the coil 5b thereof as the auxiliary coil. On the other hand, the triacs 31, 33 and 34 are turned on so that the coil 5a serves as the auxiliary coil and the coil 5b as the main coil. Furthermore, the triacs 31 and 32 are turned on when only the coil 5a serving as the main coil is excited. The triacs 33 and 34 are turned on when only the coil 5b serving as the main coil is excited. The triacs 31 and 34 are turned on when only the coil 5a serving as the auxiliary coil is excited. The triacs 32 and 33 are turned on when only the coil 5b serving as the auxiliary coil is excited.

In the fourth embodiment shown in FIG. 9, the output changeover means 44 comprises the triacs 41, 42 each serving as the semiconductor switching element and a transfer relay switch 43. More specifically, the triac 41 and contacts a, c of the relay switch 43 are serially connected between the motor terminal 5d and the power supply terminal 12b. The triac 42 and contacts b, c are serially connected between the motor terminal 5e and the power supply terminal 12b. The series circuit of the phase advance capacitor 17 and the coil 18 is connected between the contacts a, b of the relay switch 43.

According to the above-described arrangement of the fourth embodiment, the contacts a, c of the relay switch 43 are caused to close and the triacs 41, 42 are turned on so that the coil 5a of the motor 5 serves as the main coil and the coil 5b as the auxiliary coil. The contacts b, c of the relay switch 43 are caused to close and the triacs 41, 42 are turned on so that the coil 5a serves as the auxiliary coil and the coil 5b as the main coil. Furthermore, the contacts a, c of the relay switch 43 are caused to close and the triac 41 is turned on so that only the coil 5a serving as the main coil is excited. The contacts b, c of the relay switch 43 are caused to close and the triac 42 is turned on so that only the coil 5b serving as the main coil is excited. The contacts b, c of the relay switch 43 are caused to close and the triac 41 is turned on so that only the coil 5a serving as the auxiliary coil is excited. The contacts a, c of the relay switch 43 are caused to close and the triac 42 is turned on so that only the coil 5b serving as the auxiliary coil is excited.

In the foregoing embodiments, the speed detecting means may be arranged to detect the motor speed by a current flowing in the dehydration motor or the phase difference.

The foregoing disclosure and drawings are merely illustrative of the principles of the present invention and are not to be interpreted in a limiting sense. The only limitation is to be determined from the scope of the appended claims.

We claim:

1. A washing machine comprising:
   a) a rotational tub;
   b) a single-phase induction motor driving the rotational tub in a dehydrating operation and having a main and an auxiliary coils;
   c) speed detecting means for detecting a speed of the motor, thereby generating a detection signal;
   d) output changeover means for changing between an operation mode wherein both of the main and auxiliary coils are excited and the other operation mode wherein either the main or auxiliary coil is excited; and
   e) speed control means for feedback controlling the motor by controlling the output changeover means in a stage of increase of the motor speed in the dehydrating operation, based on the detection signal from the speed detecting means and a control program stored therein, the control program including data of a first control pattern wherein both of the main and auxiliary coils of the motor are excited in low and medium speed ranges, a second control pattern wherein only the auxiliary coil of the motor is excited in the low and medium speed ranges, a third control pattern wherein both of the main and auxiliary coils of the motor are excited in a high speed range, and a fourth control pattern wherein either the main or auxiliary coil is excited in the motor high speed range, the speed control means executing the first control pattern in the low and medium speed ranges and further selectively executing the second control pattern in the low and medium speed ranges when necessary and executing either the third or fourth control pattern in the high speed range.

2. A washing machine according to claim 1, wherein the speed control means increases stepwise control target values of the motor speed in the low and medium speed ranges every time a predetermined period of time elapses.

3. A washing machine according to claim 1, wherein only a final target value is set in the speed control means as a control target value of the high speed range.

4. A washing machine according to claim 1, wherein the output changeover means includes a plurality of semiconductor switching elements each having control electrodes , the semiconductor switching elements being interposed between each coil of the single-phase induction motor and a power supply, and wherein the speed control means controls the control electrodes of the semiconductor switching elements.

5. A washing machine according to claim 4, further comprising a plurality of photo couplers electrically insulating between the speed control means and the control electrodes of the semiconductor switching elements of the output changeover means.

6. A washing machine according to claim 1, further comprising a power transmission mechanism transmitting a driving force of the motor to the rotational tub and wash stream producing means supplied with the driving force of the motor via the power transmission mechanism in a wash operation.

7. A washing machine according to claim 6, wherein the single-phase induction motor comprises two coils switched to serve either as the main or auxiliary coil so that the motor develops torque in clockwise and counterclockwise directions in accordance with the switching of the coils, wherein the output changeover means changes the relation between the main and auxiliary coils such that one of the motor coils is directly connected to the power supply to thereby serve as I 5 the main coil and such that the other coil is connected through a phase advance capacitor to the power supply to thereby serve as the auxiliary coil, and wherein the speed control means cyclically changes the relation between the main and auxiliary coils by controlling the output changeover means in the wash operation so that the motor cyclically develops torque in clockwise and counterclockwise directions alternately.

8. A washing machine according to claim 7, wherein the output changeover means includes a plurality of semiconductor switching elements each having control electrodes , the semiconductor switching elements being interposed between each coil of the single-phase induction motor and a power supply and between each coil of the single-phase induction motor and the phase advance capacitor, and wherein the speed control means controls the control electrodes of the semiconductor switching elements.

9. A washing machine according to claim 8 , further comprising a plurality of photo couplers electrically insulating between the speed control means and the control electrodes of the semiconductor switching elements of the output changeover means.

10. A washing machine according to claim 8, further comprising an inductance element connected in series to the phase advance capacitor for buffering a discharge current of the phase advance capacitor.

11. A washing machine comprising:
    a) a rotational tub;
    b) a single-phase induction motor driving the rotational tub in a dehydrating operation and having a main and an auxiliary coils, the single-phase induction motor being set at a final target speed higher than a normal speed depending upon a power supply frequency of 50 Hz and lower than a normal speed depending upon a power supply frequency of 60 Hz in the dehydrating operation;
    c) speed detecting means for detecting a speed of the motor, thereby generating a detection signal;
    d) output changeover means for changing between an operation mode wherein both of the main and auxiliary coils are excited and the other operation mode wherein either the main or auxiliary coil is excited; and
    e) speed control means for feedback controlling the speed of the motor by controlling the output changeover means in the dehydrating operation, based on the detection signal from the speed detecting means and predetermined target speeds of the motor.

12. A washing machine according to claim 11, wherein the speed control means has a control pattern in which both of the main and auxiliary coils are excited and continuously executes the control pattern in a high speed range of the motor in the dehydrating operation until the speed of the motor reaches a final target speed.

* * * * *